June 16, 1925.

H. P. BALL 1,542,330

ELECTRIC HEATER AND STOVE

Filed April 3, 1922      2 Sheets-Sheet 1

INVENTOR

Henry P. Ball

BY James C. Ledbetter

ATTORNEY

June 16, 1925.
H. P. BALL
1,542,330
ELECTRIC HEATER AND STOVE
Filed April 3, 1922   2 Sheets-Sheet 2
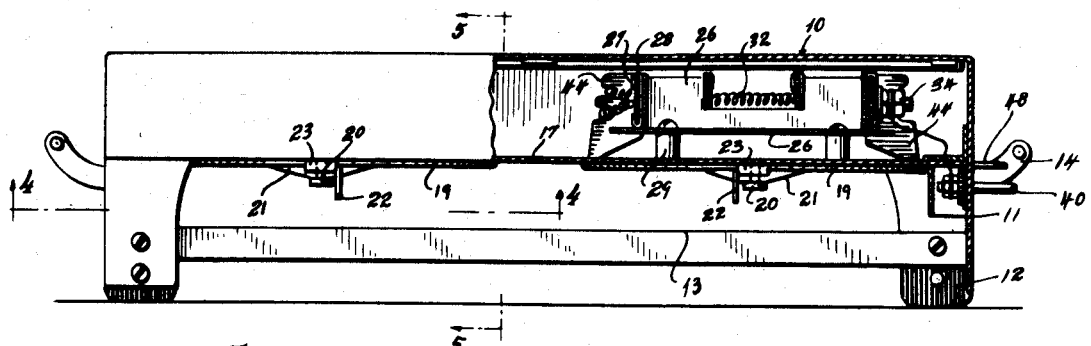
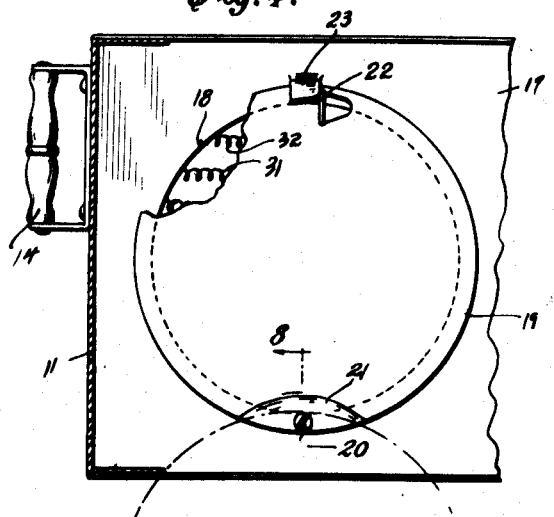
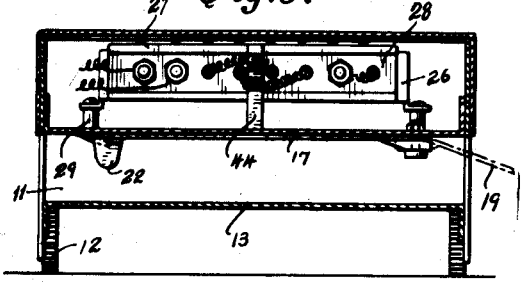
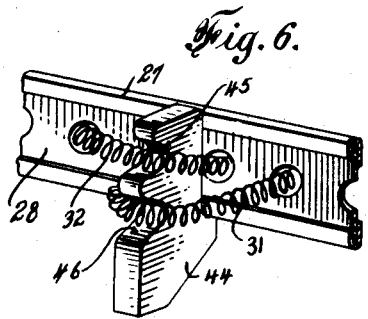
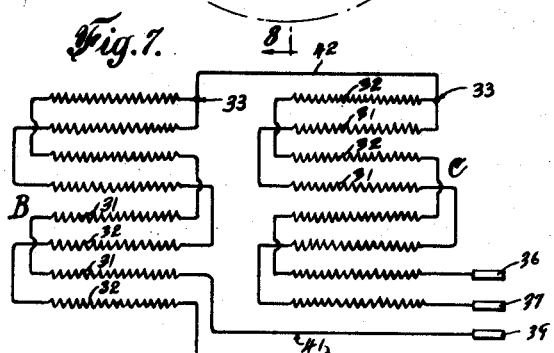
INVENTOR
Henry P. Ball
BY
James C. Ledbetter ATTORNEY Patented June 16, 1925.

1,542,330

UNITED STATES PATENT OFFICE.

HENRY PRICE BALL, OF NEW YORK, N. Y., ASSIGNOR TO REDTOP ELECTRIC CO., INC., OF NEW YORK, N. Y., A CORPORATION OF NEW YORK.

ELECTRIC HEATER AND STOVE.

Application filed April 3, 1922. Serial No. 549,018.

*To all whom it may concern:*

Be it known that I, HENRY P. BALL, a citizen of the United States, residing at New York, in the county of New York and State of New York, have invented certain new and useful Improvements in Electric Heaters and Stoves, of which the following is a specification.

This invention relates to electrical appliances and apparatus, and more particularly to improvements in electric stoves, heaters, and the like.

Primarily the object of this invention is to produce an electric heater and stove having a structure improved in respect to general assembly and organization of parts; to produce a stove of pleasing appearance, strong in construction and economical to manufacture; and to produce a heater and stove having a number of heating units or cooking spaces composed of resistance coils so contrived and arranged that all the coils may be heated in one particular space to concentrate all the available heat, and so arranged and contrived that a part of the resistance coils in all the heating units or cooking spaces may be simultaneously heated to produce moderate temperature in or at the several heating spaces.

An electrical apparatus or heater constructed in accordance with the plans of this invention, consists of a frame which provides an upper and lower cooking surface with suitable electrical heating units disposed between the two surfaces for radiating heat upwardly and downwardly to both surfaces; and means is provided for closing off the lower cooking surface so as to direct all the heat upwardly. In addition to these features the stove embodies a number of heating units which have resistance coils so arranged that maximum efficiency in current consumption obtains in the use of the stove. There are special features of construction and operation, as will hereinafter appear.

The accompanying drawings illustrate an embodiment of my invention, and though there is shown a preferred form of construction I claim a right of protection as to such changes in form as may come within the scope of my invention.

Figure 3 shows a side view in lengthwise elevation similarly with a part thereof shown in section to illustrate a side view of the same heating unit, the section being taken on line 3—3 of Figure 2.

Figure 4 shows an underneath plan view of a portion of the heater, to illustrate one of the deflector disks or caps employed to divert the heat upwardly when the lower cooking surface or table is not in use.

Figure 5 is a cross section view taken on the line 5—5 of Figure 3.

Figure 6 shows, in perspective view, the assembly of an insulating block and frame part as employed to anchor the resistance coils and hold them in spaced relation upon the frame.

Figure 7 shows a diagrammatic view of of several, in this instance two, heating units, both of which may be simultaneously heated, or one of which may be used to produce maximum heating temperature.

Figure 8 is a sectional view of a certain improved cover cap used in this heater and stove.

Figure 1:
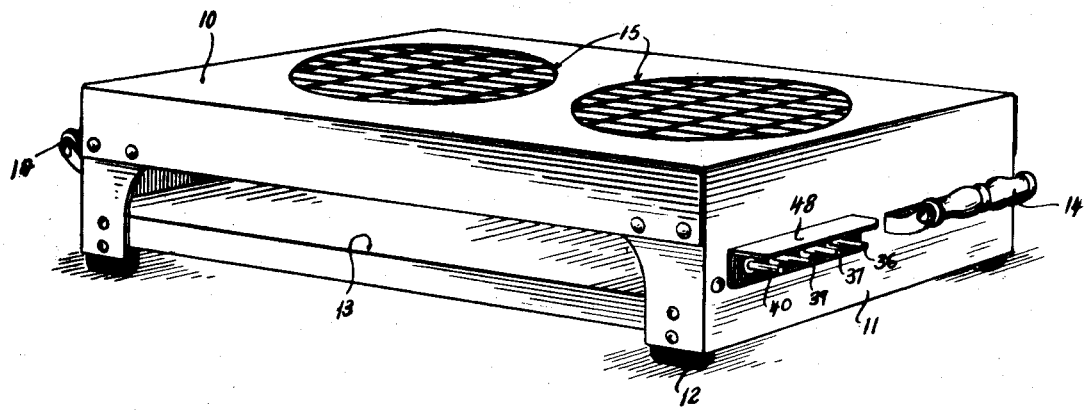
Figure 1 illustrates a perspective view of the stove.
Figure 2:
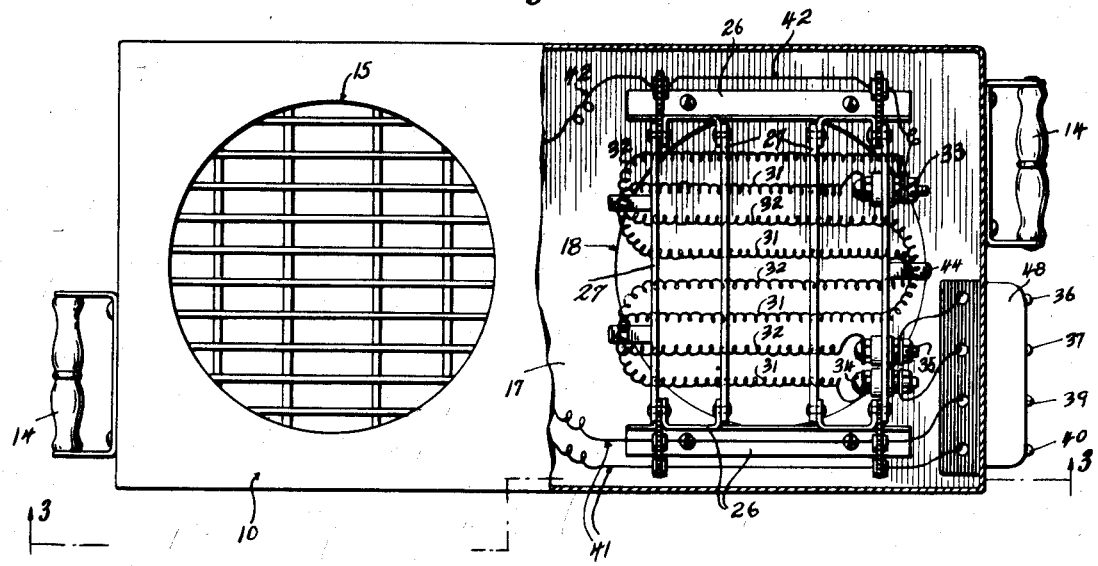
Figure 2 shows a plan view thereof with a part of the stove in section to expose one heating unit.

Referring further to the drawings for a more detailed description of the invention, there is shown a frame structure, preferably made of sheet metal forming a top piece 10 and ends 11, which frame has foot or support pads 12. An oven plate 13 is secured in the frame and provides a lower cooking surface which receives its heat from above, as will hereinafter be shown. This lower cooking plate 13 is used more or less as an oven for toasting, or for cooking or browning the top surfaces of food preparations. A handle 14 is secured to each end of the stove, and the handles preferably are disposed in diagonal relation for the purpose of leaving a suitable side space at one end for the several terminal plugs, as will hereinafter appear.

The stove has two or more open cooking spaces 15 formed in the upper surface 10. A frame comprising a plate 17 is secured in the stove frame and has circular openings 18 for the purpose of radiating heat downwardly onto the lower oven plate 13. Each opening 18 is covered with a movable cap 19, the rear edge of the cap being hinged on a screw or pin 20, which pin is anchored to the plate 17. The cap 19 is bent downwardly on the periphery thereof adjacent the pivotal point 20, as is pointed out at 21, representing a creased or distorted portion of the cap rim. When the cap is swung from its normal closed position shown in Fig. 4, rearwardly to the dotted line position, the distorted margin 21 gives the cap a freedom of motion which permits it to hang downwardly at an angle to the horizontal position of the stove. This angular or down-hanging position of the cap 19 is shown in Fig. 5, which facilitates cleaning the stove parts, and furthermore aids in diverting heat towards the front and upper portion of the stove which heat would otherwise radiate downwardly through the rear stove portions. On the front edge of the cap there is formed a thumb or handle piece 22 which the user grasps when moving the plate into closed or open position. This thumb piece may economically be formed on the cap by a punching process to form this struck-up handle part 22. The plate 17 is made with a punched or struck-up portion which forms a lock or catch 23 overhanging the periphery of the cap 19 in such a way that the rim of the cap is thrust under the catch 23, and then the handle 22 comes to rest against the said catch 23, whereby the cap 19 is held in secure position over the circular opening 18 to direct all the heat upwardly, which excludes the heat from the oven plate 13.

Electrical heating units, B and C, are disposed between the frame plate 17 and upper stove surface 10. Each electrical heating unit is placed between the stove openings 15 and 18 so that heat emanating therefrom passes through the openings. For convenience in manufacturing and assembling the stove, each heating unit is assembled upon the plate 17 so that they are disposed in position when the plate 17 is screw-fastened or assembled in the frame 10—11. A heating unit is composed of one or more resistance coils assembled upon a frame consisting of spacer bars with insulating sheets such as mica. The frame for holding the resistance coils consists of end pieces 26 which carry spacer or support bars 27, and the bars 27 carry mica insulating sheets 28 upon or in which are carried the electrical resistance coils. This frame 26—27 is secured to the plate 17 by a screw-fastened spacer ferrule 29 which holds the resistance coils substantially midway between the two frame plates 10 and 17.

Each heating unit B and C preferably is composed of two or more resistance coils 31 and 32, which are joined at one end in series by connecting the said ends to the terminal screw 33. The other free ends of the two resistance coils are respectively anchored to terminal screws 34 and 35. The terminal screws 34 and 35 are respectively connected through circuit wires to terminal plugs 36 and 37. It is to be noted that the plugs 36 and 37 are in series with the two resistance coils 31 and 32, and when the two plugs are connected with a current supply fixture then current is fed through both resistance coils 31 and 32 of the heating unit C, whereby all the coils in the heating unit C are raised to maximum temperature, producing maximum heat in one of the cooking spaces 15 and 18. The structure and arrangement of the two electrical heating units B and C are identical one with the other, as will be understood from the immediately foregoing description, which explains the single heating unit C.

An additional set of terminal plugs 39 and 40 is secured to the end of the stove, and these two plugs are connected with the unit B through circuit wires 41, as will be noted in Fig. 7. When the terminal plugs 39 and 40 are connected to a current supply fixture, current is fed through the series arrangement of resistance coils 31 and 32 in unit B to produce maximum temperature in this particular unit. As aforesaid, the two coils 31 and 32 of each unit B and C, have their outer ends joined together at 33, which places these two coils in series; and when either pair of terminal plugs, for example 36 and 37, is selected for connection with the current supply fixture, only the one heating unit C burns to produce maximum heat radiation. A circuit wire 42 has its terminal ends connected with the screw 33 or with the connection points 33, as in Fig. 7, of each heating unit B and C, in such manner that the outer ends of the pair of resistance coils of each heating unit are electrically connected. It is to be noted, therefore, that the circuit wire 42 is the only electrical connection existing between the heating units B and C, and that this connection 42 does not transmit current from one unit to the other when either outer pair of terminal plugs is attached to a current supply fixture. For example, when the pair of terminal plugs 39 and 40 is used to feed current to the unit B, no current flows to the unit C.

The foregoing wiring plan provides means for simultaneously electrically heating both units B and C. If the two inner terminal plugs 37 and 39 are selected for connection to a current supply fixture, it then follows that current flows to both units B and C by running through every other parallel resistance coil of each unit. The resistance coil 31 only, omitting the resistance coil 32 of each unit B and C, is connected in series with the terminal plugs 37 and 39. This particular form of wiring plan or diagram enables the user, by selecting the two middle plugs 37 and 39, to heat every other coil of both units, whereby cooking may be simultaneously done upon both heating units B and C; and in this arrangement moderate temperature exists when electrical current is fed through the two central plugs 37 and 39.

As above described, the frame 27—28 carries the plurality of electrical resistance coils 31 and 32, and for this purpose holes are made in the mica sheets 28; and the coils are woven through the frame and supported in spaced parallel relation, being adequately insulated one from the other. An insulating block 44 is disposed on the outer surface of each spacer bar 27 for the purpose of holding the coils in position and spaced one from the other at the point of turn, where each coil passes through the outer spacer bar 27 and back through the frame at a point beneath and adjacent to the other coil. This insulating block has an upper notch 45 and a lower notch 46. This structure is shown in Fig. 6, where for example, the resistance coil 31 passes through the mica sheet 28 and is securely held in position by the notch 46 while the other coil 32 is simultaneously held in position by the upper notch 45. The tension of the resistance coils serves to hold the plug 44 in position against the frame, and the two notches positively support the coils 31 and 32 to prevent any possibility of short-circuiting the electrical apparatus.

The two pairs of terminal plugs, consisting of the four plugs as above described, are anchored on the end of the stove and protected by a guard plate 48. The position of the guard plate and terminal plugs renders it necessary to place the handle 14 adjacent one corner of the stove, and in order that the stove balance when lifted. The other handle is diagonally placed on the other end of the stove, which maintains the symmetry of design and renders accessible the terminal plugs for connection with a current supply fixture.

What I claim is—

1. An electrical stove and heater comprising a frame, a plate provided with an opening disposed in the frame, an electrical heating unit mounted on the frame above the opening in the aforesaid plate, an oven plate disposed beneath the aforesaid plate, and a heat-deflecting cap arranged to uncover the opening whereby heat is radiated downwardly upon the oven plate.

2. An electrical heater consisting of a frame provided with a heat-emitting hole or opening, an electrical heating unit disposed in line with the opening, a cover cap, a bent down portion formed on the periphery of the cap, and a pivotal pin carrying the cover cap at the bent down periphery, the arrangement being such that the cap is swung outwardly on the pin to hang in an angular supported relation.

3. An electric heater having variable heats comprising a number of heating units, resistance coils composing each unit, a current supply line to heat all the coils of one unit to obtain high temperature in that unit, and a current supply line to feed current to only a part of the coils in all the units to produce low degree temperature in said units.

4. An electric heater comprising a frame, variable temperature heating units comprising coils, insulating blocks disposed on the frame supporting the coils and held in position by the coils, each heating unit consisting of separated heating coils arranged to cross one over the other at the insulating block, a pair of electrical terminals connected in series with the coils of each unit adapted to feed current to all the coils in one unit, one terminal of each pair being adapted to feed current to every other coil of each unit, and a cover plate arranged to reflect the heat upwardly and swingable in and out of the frame.

5. Improvements in electrical heaters and the like, comprising a frame, insulating blocks mounted on the frame, a plurality of sets of independently heated resistance coils carried by the frame and spaced apart on the blocks, circuit means for heating at will one or more of the coils, a plate supported on the frame, a lower cooking oven, an upper cooking surface, and a movable cap controlling a heat opening leading to the lower cooking oven.

6. An electric heater and cooking stove comprising in combination, a frame, a plurality of resistance coils carried thereon, said coils being grouped to form a number of separate heating units, terminal plugs connecting with the resistance coils in such a manner that one pair of selected terminal plugs feeds current to all the coils of a heating unit, another pair of terminal plugs feeds current to only part of the coils of all the heating units, said frame providing a plurality of cooking spaces, one space having high temperature, or all the spaces having low temperature.

7. An electric heater and stove comprising in combination, a number of heating units, a frame carrying the units and having cooking or heating openings or burners, each unit placed in the frame opening and composed of a pair of resistance coils joined in series, a pair of terminal plugs connected with each coil to supply current thereto, circuit wires connecting together one coil of each unit, and another pair of terminal plugs connected with the circuit wires, whereby the first named terminals supply current to one heating unit, and the second named terminals supply current to all the units to provide on burner of high temperature or several burners working simultaneously at low temperature, and diagonally arranged handles mounted on the frame which permits the aforesaid plugs to be installed adjacent one of the handles.

In testimony whereof I affix my signature at New York, N. Y., this 28th day of March, 1922.

HENRY PRICE BALL.